US011640031B2

(12) United States Patent
Bickham et al.

(10) Patent No.: US 11,640,031 B2
(45) Date of Patent: May 2, 2023

(54) LASER-CLEAVING OF AN OPTICAL FIBER ARRAY WITH CONTROLLED CLEAVING ANGLE

(71) Applicant: CORNING RESEARCH & DEVELOPMENT CORPORATION, Corning, NY (US)

(72) Inventors: Scott Robertson Bickham, Corning, NY (US); Joel Patrick Carberry, Big Flats, NY (US); Randy LaRue McClure, Corning, NY (US); Craig John Mancusi Ungaro, Corning, NY (US); Qi Wu, Painted Post, NY (US); Lei Yuan, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/321,886

(22) Filed: May 17, 2021

(65) Prior Publication Data
US 2021/0373238 A1    Dec. 2, 2021

Related U.S. Application Data

(60) Provisional application No. 63/030,473, filed on May 27, 2020.

(51) Int. Cl.
*G02B 6/25* (2006.01)
*G02B 6/04* (2006.01)

(52) U.S. Cl.
CPC ....... *G02B 6/25* (2013.01); *G02B 6/04* (2013.01)

(58) Field of Classification Search
CPC .................................... G02B 6/25; G02B 6/04
(Continued)

(56) References Cited

U.S. PATENT DOCUMENTS 7,142,741 B2    11/2006    Osborne
9,167,626 B1    10/2015    Wu
(Continued)

FOREIGN PATENT DOCUMENTS

WO    2004/003612 A1    1/2004

OTHER PUBLICATIONS

Boyd et al., "High precision 9.6 μm CO2 laser end-face processing of optical fibres", In Optics Express, vol. 23, Issue 11, 2015, pp. 15065-15071.
(Continued)

*Primary Examiner* — Jerry M Blevins

(57) ABSTRACT

The present disclosure relates to a process by which an optical fiber array is cleaved with a laser-cleaving apparatus. The coating material is stripped or removed from a section of an optical fiber array; a coated or ribbonized section of the optical fiber array is secured in a holder; the holder is aligned inside the laser-cleaving apparatus; the laser cleaves the stripped ends of the fibers in the optical fiber array; the laser-cleaved ends of the optical fibers are then mechanically separated to remove the free ends from the optical fibers in the optical fiber array, leaving a cleaved array of optical fibers. The cleaving process enables the optical fiber array to be cleaved at flexible locations along an optical fiber ribbon or optical fiber cable with no swelling, minimal cleave angle variation across the cores of the optical fibers, a controlled surface roughness of the optical fiber end-faces, and high process yield.

10 Claims, 16 Drawing Sheets

(58) Field of Classification Search
USPC ........................................................ 385/115
See application file for complete search history.

(56) References Cited

U.S. PATENT DOCUMENTS

| | | | |
|---|---|---|---|
| 9,416,046 B2 | 8/2016 | Carberry et al. | |
| 2005/0105871 A1* | 5/2005 | Staupendahl | B23K 26/082 |
| | | | 385/134 |
| 2010/0303416 A1 | 12/2010 | Danley et al. | |
| 2015/0165560 A1 | 6/2015 | Hackert et al. | |
| 2018/0057390 A1* | 3/2018 | Hackert | C03C 3/093 |
| 2019/0227235 A1 | 7/2019 | Zheng et al. | |

OTHER PUBLICATIONS

Paviolo et al., "Angle Cleaving Optical Fibers using a CO2 Laser", In 35th Australian Conference on Optical Fibre Technology, 2010, 4 pages.
Steenberge et al., "Laser cleaving of glass fibers and glass fiber arrays", In Journal of Lightwave Technology, Feb. 2005, 6 pages.
European Patent Application No. 21176323 European search report dated Sep. 27, 2021, 10 pages; European Patent Office.

\* cited by examiner

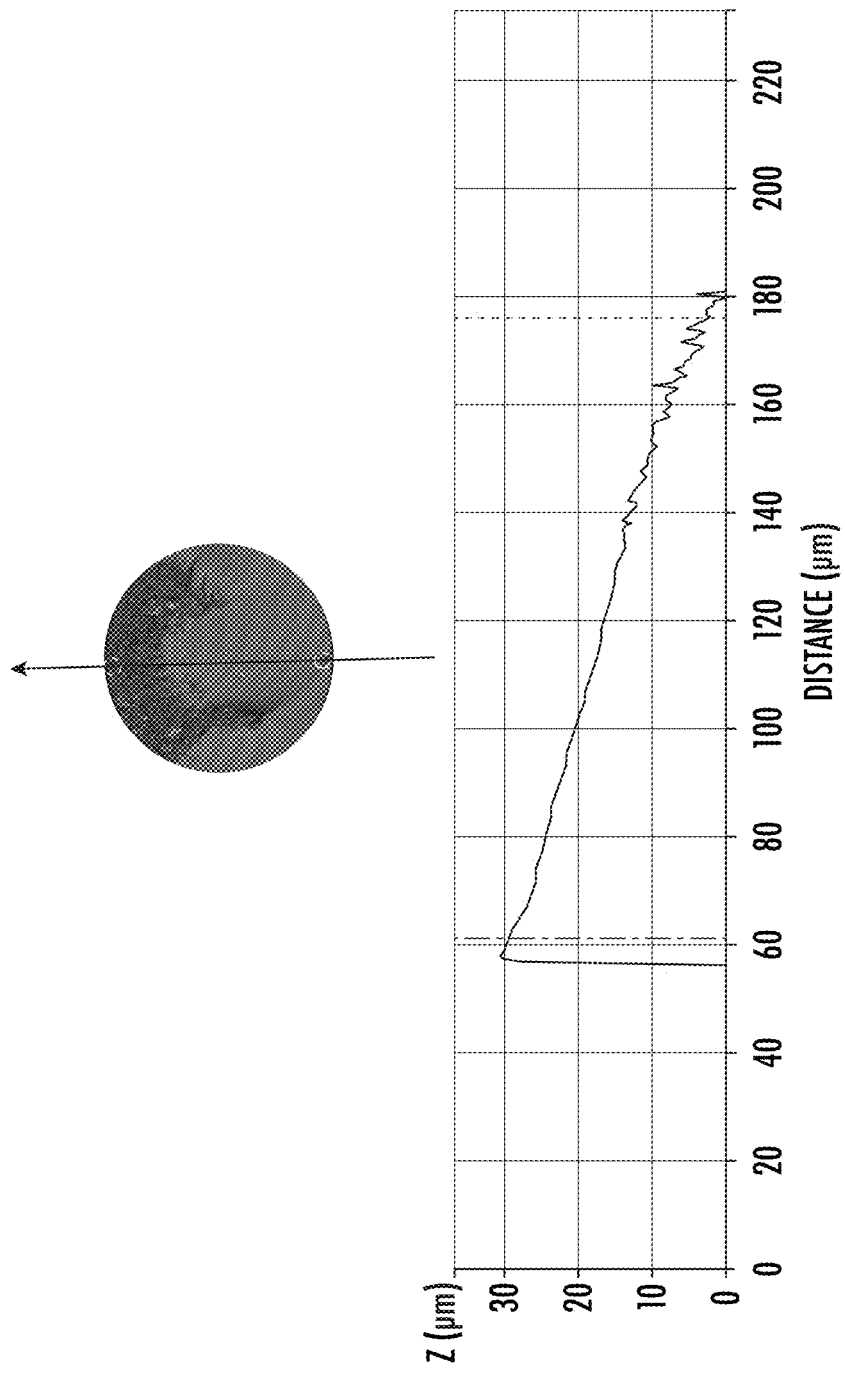

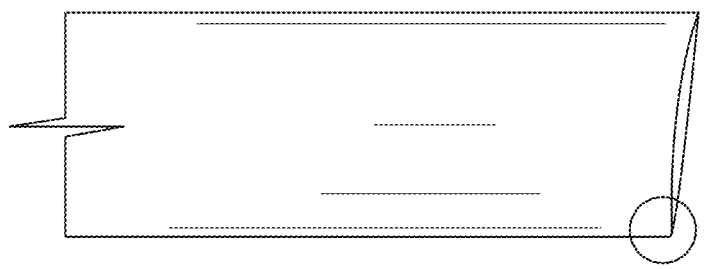
FIG. 13E
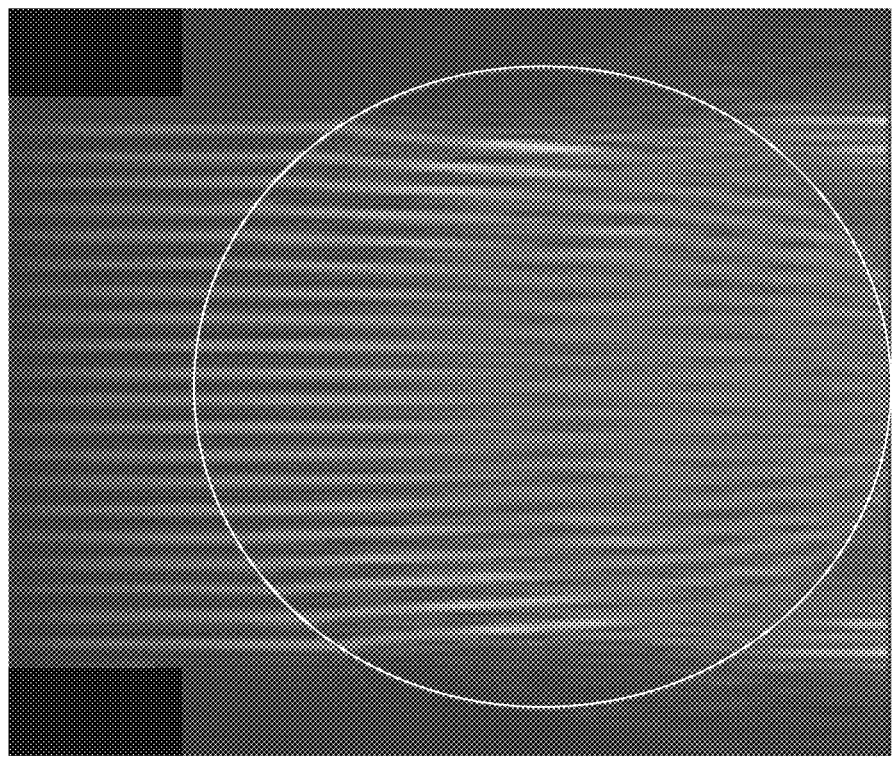
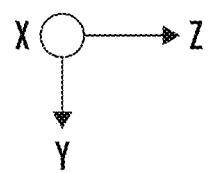
FIG. 13F

LASER-CLEAVING OF AN OPTICAL FIBER ARRAY WITH CONTROLLED CLEAVING ANGLE

PRIORITY APPLICATION

This application claims the benefit of priority of U.S. Provisional Application No. 63/030,473, filed on May 27, 2020, the content of which is relied upon and incorporated herein by reference in its entirety.

FIELD OF THE DISCLOSURE

This disclosure relates generally to processing an optical fiber array with a laser-cleaving apparatus and more particularly, to cleaving an optical fiber array with a laser-cleaving apparatus followed by mechanical separation of the cleaved ends of the optical fibers in the optical fiber array.

BACKGROUND OF THE DISCLOSURE

Optical fibers are commonly used for voice, video, and data transmissions in many different settings. In these settings where optical fibers are used, there are typically many locations where fiber optic cables carrying the optical fibers connect to equipment or other fiber optic cables. For example, in Micro-Electro-Mechanical-System (MEMS) applications, optical fibers (as part of optical fiber ribbons) are connected to a planar MEMS.

The emergence of MEMs applications and expanded beam connectors require angled cleaving of the end-faces of the optical fibers, which may be buffered, ribbonized and/or packaged in cables, with minimum insertion loss and desirable performance. Normally, it is common to produce an 8° final angle tip on each optical fiber for coupling applications, to minimize back reflections.

The main methods used to obtain angled tips include: mechanical cleavers, polishing tools, and lasers. The use of mechanical cleavers is common, despite the issues of wear and chipping angles. However, large glass roll-off variations in the flatness of the core region of the optical fiber and variations in cleave length and angles are challenges for this method.

Mechanical polishing is another common method used. Polishing involves a holder supported at an angle while the optical fiber is mechanically polished at the desired angle. However, polishing is time consuming and generally increases the cost of the final product. Also, while multiple fibers can be secured in a holder to increase the efficiency of the polishing step, it can be difficult to consistently achieve the same polishing angle on the end-faces of all the fibers.

Lasers (e.g., $CO_2$ lasers) have only recently been introduced to obtain angle cleaving and been used in mass production. However, due to the large beam size (i.e., longer wavelength) and thermal effects that melt rather than cleave the optical fiber, there are difficulties to reduce the heat affected zone and to minimize swelling of the optical fiber during cleaving.

The respective technical challenges of each of the aforementioned techniques necessitates a new approach for cleaving an array of optical fibers at a precise angle.

SUMMARY OF THE DISCLOSURE

The present disclosure relates to a process by which an array of optical fibers is cleaved with a laser-cleaving apparatus. The coating material is stripped or removed from a section of an optical fiber array; a coated or ribbonized section of the optical fiber array is secured in a holder; the holder is aligned inside the laser-cleaving apparatus; the laser cleaves the stripped ends of the fibers in the optical fiber array; the laser-cleaved ends of the optical fibers are then mechanically separated to remove the free ends from the optical fibers in the optical fiber array, leaving a cleaved array of optical fibers. The cleaving process enables the optical fiber array to be cleaved at flexible locations along an optical fiber ribbon or optical fiber cable with no swelling, minimal cleave angle variation across the cores of the optical fibers, a controlled surface roughness of the optical fiber end-faces, and high process yield.

In one embodiment, a laser-cleaved optical fiber array is provided. The laser-cleaved optical fiber array includes: a plurality of optical fibers, each optical fiber having a fiber end-face including an end-face core, each fiber end-face of the optical fibers having a surface area, the surface area comprising a rough area that defines at least a portion of the surface area; wherein the rough area has a surface roughness between 0.1 µm and 0.5 µm root mean squared (rms) as measured by a confocal microscope.

In another embodiment, for each fiber end face, a remainder of the surface area that excludes the rough area of the fiber end-face has a surface roughness of less than 10 nm rms. In another embodiment, the rough area of each fiber end-face comprises at least 5% of the surface area. In another embodiment, the rough area of each fiber end-face comprises over 80% of the surface area. In another embodiment, each fiber end-face has a surface roughness of less than 10 nm rms in the end-face core. In another embodiment, each fiber end-face has a surface roughness of between 0.1 µm and 0.5 µm rms in the end-face core. In another embodiment, for each optical fiber, the fiber end-face has a diameter that is substantially consistent with a diameter of the optical fiber measured at a distance of about 1 mm from the fiber end-face, and wherein the fiber end-face diameter and the optical fiber diameter have a difference of less than 0.2 µm. In another embodiment, the end-face core is substantially concentric with a fiber core of the optical fiber measured at a distance of about 1 mm from the fiber end-face, and wherein the end-face core and the fiber core have an offset at the fiber end-face less than 0.1 µm. In another embodiment, each fiber end-face is substantially flat with a cleave angle between 0 degrees and 15 degrees relative to a longitudinal axis of each optical fiber.

In one embodiment, a method of laser-cleaving an optical fiber array is provided. The method of laser-cleaving an optical fiber array includes: operating a laser system to create a perforation along each optical fiber of the optical fiber array, wherein the laser system includes an ultrafast laser emitting a laser beam and a stage upon which the optical fiber array is positioned, and wherein the laser beam is applied to form the perforation on the optical fiber array; and separating the optical fibers of the optical fiber arrays along the perforation to form cleaved optical fibers; wherein each cleaved optical fiber of the optical fiber array comprises a fiber end-face having a surface area, the surface area including a rough area comprising at least a portion of the surface area; wherein the rough area has a surface roughness between 0.1 µm and 0.5 µm root mean squared (rms) as measured by a confocal microscope.

In another embodiment, the laser beam has a wavelength ranging between 700 nm and 1400 nm, a pulse width between 5 picoseconds and 15 picoseconds, and a repetition rate between 25 kHz and 75 kHz. In another embodiment, the ultrafast laser has a power output ranging between 5 W and 8 W. In another embodiment, the laser system includes a reflecting mirror and a series of lenses; and wherein operating the laser system includes emitting the laser beam in a first direction, reflecting the laser beam in a second direction at an angle substantially orthogonal to the first direction; wherein the laser beam is passed through the series of lasers to form a Bessel beam. In another embodiment, the stage includes an upper stage and a lower stage upon which the upper stage rests; and wherein the upper stage is angled with respect to an upper surface of the lower stage at an angle between −15 degrees and 15 degrees. In another embodiment, separating the optical fibers comprises applying pressurized air onto the optical fiber array such that the optical fiber array is cleaved, wherein the pressurized air is applied at a pressure ranging between 25 psi and 50 psi over a time interval ranging between 0.1 seconds and 1.5 seconds. In another embodiment, the pressurized air is applied to the optical fiber array at an angle relative to a longitudinal axis of each optical fiber of the optical fiber array, the angle ranging between 30 degrees and 60 degrees. In another embodiment, the perforation along the optical fiber array comprises a plurality of holes with a pitch ranging between 1.0 µm and 5.0 µm.

In one embodiment, a method of laser-cleaving an optical fiber array is provided. The method of laser-cleaving an optical fiber array includes: operating a laser system to form a perforation along each optical fiber of the optical fiber array, wherein the laser system includes an ultrafast laser emitting a laser beam and a stage upon which the optical fiber array is positioned, and wherein the laser beam is applied to form the perforation onto the optical fiber array; mounting the optical fiber array onto a motorized stage, wherein a first section of the motorized stage includes a first clamp applied onto a first side of the perforation of the optical fiber array and wherein a second section of the motorized stage includes a second clamp applied onto a second side of the perforation of the optical array; and separating the optical fibers of the optical fiber array along the perforation to form cleaved optical fibers; wherein separating the optical fibers of the optical fiber array along the perforation comprises applying tensile stress onto the optical fibers along the perforation by moving at least one of the first section or the second section of the motorized stage along a length of the optical fibers.

In another embodiment, each cleaved optical fiber of the optical fiber array comprises a fiber end-face having a surface area and a rough area; and wherein the rough area defines a portion of the surface area and has a surface roughness between 0.1 µm and 0.5 µm root mean squared (rms) as measured by a confocal microscope. In another embodiment, a remainder of the surface area that excludes the rough area of the fiber end-face has a surface roughness of less than 10 nm rms. In another embodiment, the rough area of each fiber end-face comprises at least 5% of the surface area. In another embodiment, the rough area of each fiber end-face comprises over 80% of the surface area. In another embodiment, each fiber end-face is substantially flat with a cleave angle between 0 degrees and 15 degrees relative to a longitudinal axis of each optical fiber. In another embodiment, the laser beam has a wavelength ranging between 700 nm and 1400 nm, a pulse width between 5 picoseconds and 15 picoseconds, and a repetition rate between 25 kHz and 75 kHz. In another embodiment, the ultrafast laser has a power output ranging between 5 W and 8 W. In another embodiment, the laser system includes a reflecting mirror and a series of lenses; wherein operating the laser system includes emitting the laser beam in a first direction, reflecting the laser beam in a second direction at an angle substantially orthogonal to the first direction; and wherein the laser beam is passed through the series of lasers to form a Bessel beam. In another embodiment, the stage includes an upper stage and a lower stage upon which the upper stage rests; and wherein the upper stage is angled with respect to an upper surface of the lower stage at an angle between −15 degrees and 15 degrees. In another embodiment, the perforation along the optical fiber array comprises a plurality of holes with a pitch ranging between 1.0 µm and 5.0 µm.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 12 relates to Example 2 and an end-face of an optical fiber after mechanical separation by tension in accordance with the present disclosure;

FIG. 13E relates to Example 3 and shows a side view image of a water-assisted laser-cleaved optical fiber; and FIG. 13F relates to Example 3 and shows a simulation of refraction of Bessel beams incident on an optical fiber surface immersed in water.

DETAILED DESCRIPTION

Figure 1:
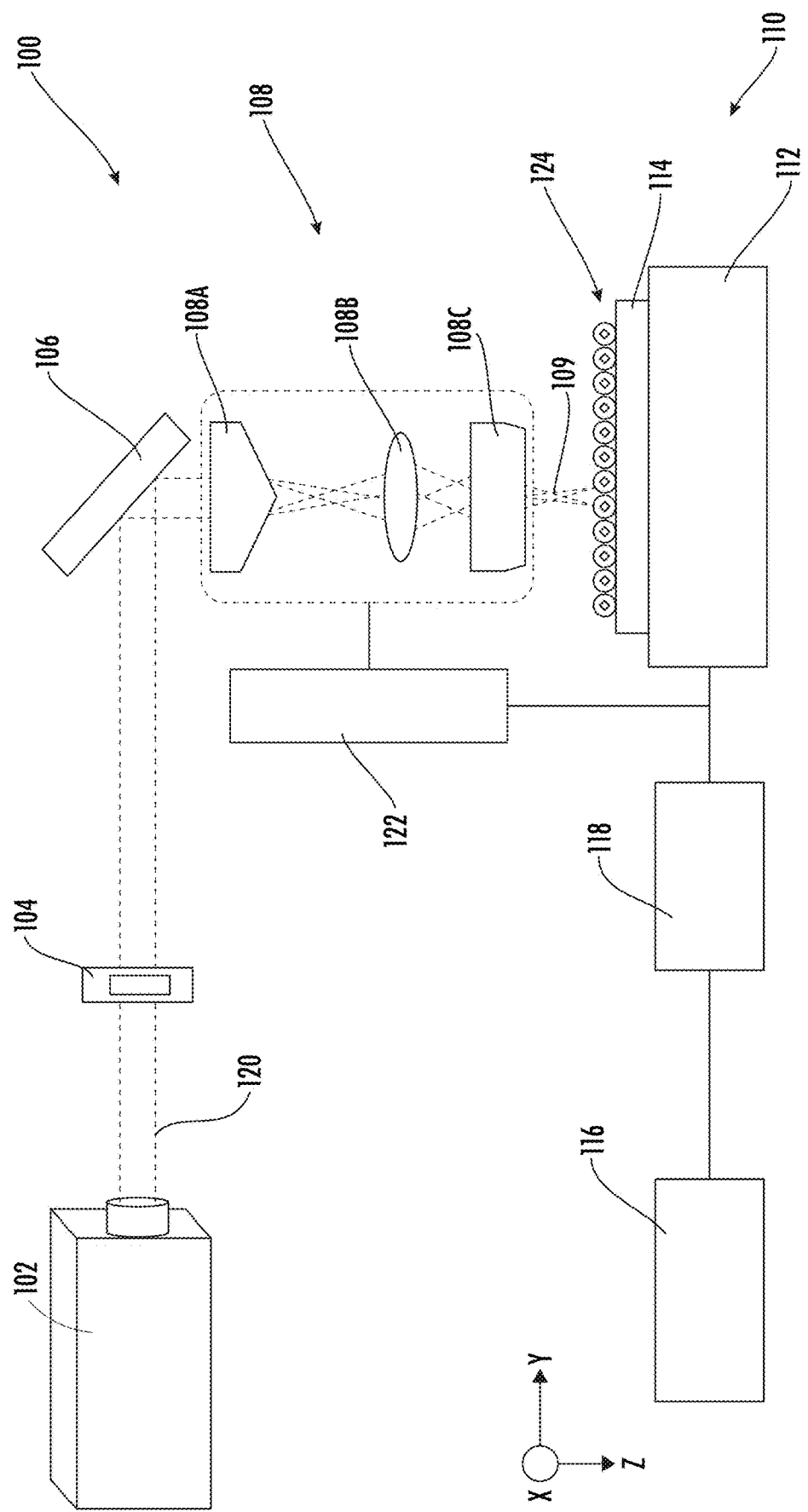
FIG. 1 is a schematic of an example laser-cleaving apparatus according to the present disclosure.

Various embodiments will be clarified by examples in the description below. In general, the present disclosure relates to a process by which an array of optical fibers is cleaved with a laser-cleaving apparatus. The coating material is stripped or removed from a section of an optical fiber array; a coated or ribbonized section of the optical fiber array is secured in a holder; the holder is aligned inside the laser-cleaving apparatus; the laser cleaves the stripped ends of the fibers in the optical fiber array; the laser-cleaved ends of the optical fibers are then mechanically separated to remove the free ends from the optical fibers in the optical fiber array, leaving a cleaved array of optical fibers. The cleaving process enables the optical fiber array to be cleaved at flexible locations along an optical fiber ribbon or optical fiber cable with no swelling, minimal cleave angle variation across the cores of the optical fibers, a controlled surface roughness of the optical fiber end-faces, and high process yield.

In this disclosure, the term "optical fiber" (or "fiber") will be used in a generic sense and may encompass bare optical fibers, coated optical fibers, buffered optical fibers, optical fiber ribbons, a planar array of coated optical fibers, or a ribbonized array of coated optical fibers as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylate material) surrounding the fiber cladding and have a nominal (i.e., stated) diameter that is typically no greater than twice the nominal diameter of the bare optical fiber. "Buffered optical fibers" or "buffered sections" are coated optical fibers with an additional buffer that increases the nominal diameter of the optical fiber to more than twice the nominal diameter of the bare optical fiber, with 900 μm being the most typical nominal diameter. Buffered optical fibers may also be referred to as "buffered cables." Finally, the term "unbuffered optical fibers" refers to optical fibers without a buffer, and therefore may encompass either bare optical fibers, coated optical fibers or coated optical fibers which have a pigmented outer coating layer.

In certain embodiments, pre-coated (i.e., acrylate coated) optical fibers are prepared for cleaving and other downstream optical fiber processing (e.g., fusion bonding) by stripping the ends thereof utilizing non-contact fiber stripping methods and/or apparatuses, such as those disclosed in U.S. Pat. No. 9,167,626 B2 ("the '626 Patent"), which is hereby incorporated by reference. Briefly, the '626 Patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength.

In certain embodiments, unjacketed optical fiber segments emanating from the same jacket may be initially loose, but subsequently ribbonized to provide consistent spacing between fibers to facilitate cleaving and/or downstream optical fiber processing (e.g., utilization of a mass fusion splicing process for forming multiple splice joints between multiple pairs of optical fibers in a substantially simultaneous manner). To fabricate an optical fiber ribbon, optical fibers of an unjacketed segment may be contacted with at least one polymeric material (e.g., a thermoplastic hotmelt material) in a flowable state, and the at least one polymeric material may be solidified.

Optical fibers of a first plurality of optical fiber segments and of a second plurality of optical fiber segments may be arranged in first and second conventional fiber sorting fixtures, respectively, during stripping and/or subsequent optical fiber processing steps (e.g., fusion bonding steps). A typical fiber sorting fixture includes a slot having an opening dimension (e.g., height) that closely matches a corresponding dimension of unbuffered, coated optical fibers to maintain portions of the optical fibers proximate to ends to be stripped (and subsequently cleaved and/or fusion spliced) in fixed, substantially parallel positions embodying a one-dimensional array. In certain embodiments, coated optical fibers having outer diameters of either 200 μm or 250 μm may laterally abut one another in a fiber sorting fixture, such that cores of adjacent optical fibers are also spaced either 200 μm or 250 μm apart. After stripping of acrylate coating material from end sections (to form stripped sections) of the optical fibers, the remaining (bare glass) cladding and core portions are in a non-contacting (and non-crossing) relationship, and bare glass ends of the optical fibers may be cleaved as discussed below. Variations of the techniques disclosed in the '626 Patent are disclosed in U.S. Patent Nos. 10,018,782 and 9,604,261, the disclosures of which are also hereby incorporated by reference herein. Non-contact stripping methods using lasers or hot gases are also possible in certain embodiments.

Figure 3:
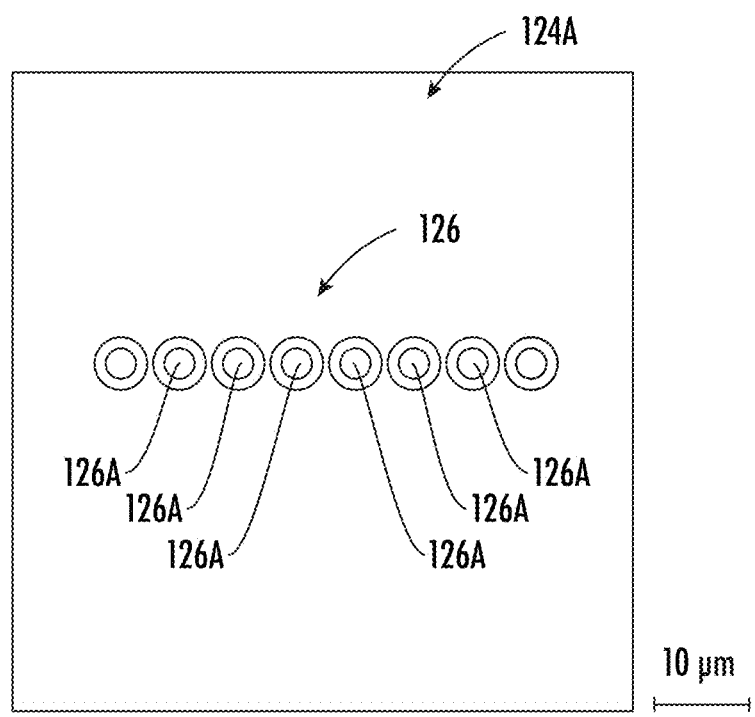
FIG. 3 relates to Example 1 and is an image of an optical fiber after undergoing laser treatment by the laser apparatus of FIG. 1.

Referring to FIG. 1, a laser-cleaving apparatus 100 is shown. Laser-cleaving apparatus 100 is configured to cleave the stripped ends of an array of optical fibers 124 with coated or ribbonized regions that are secured into stage 110 as discussed below. In particular, as discussed in greater detail herein, laser-cleaving apparatus 100 creates a series of apertures 126A (FIG. 3) in each of the optical fibers in the optical fiber array 124 to form a perforation 126 (FIG. 3). In one embodiment, the optical fibers in the optical fiber array 124 have core and cladding diameters of about 9.0 and 125 μm, respectively. However, it is contemplated that alternate optical fibers with alternate core and cladding dimensions may be used in the context of the present disclosure.

Apparatus 100 includes a laser 102, a shutter 104, a reflecting mirror 106, a series of lenses 108, and a stage 110. As shown in FIG. 1, laser 102 emits a laser beam 120 in the y-direction of the Cartesian coordinate system as defined in the Figure. Laser beam 120 has a wavelength in the range of 500 nanometers (nm) and 2000 nm, 600 nm and 1700 nm, or 700 nm and 1400 nm. In one embodiment, laser beam 120 has a wavelength of 1030 nm. In some embodiments, laser 102 is an ultrafast laser. However, it is contemplated that in alternate embodiments, a different suitable type of laser may be used. In some embodiments, laser 102 emits laser beam 120 at a pulse width between 1 picoseconds (ps) and 20 ps, 3 ps and 17 ps, or 5 ps and 15 ps. In one embodiment, the pulse width of laser beam 120 emitted from laser 102 is 10 ps. In some embodiments, laser 102 emits laser beam 120 at a repetition rate ranging between 15 kilohertz (kHz) and 100 kHz, 20 kHz and 85 kHz, or 25 kHz and 75 kHz. In one embodiment, laser 102 emits laser beam 120 at a repetition rate of 50 kHz. In some embodiments, laser 102 emits laser beam 120 at an output power ranging between 1 Watt (W) and 10 W, 3 W and 9 W, or 5 W and 8 W with a corresponding actual laser energy used for perforating an optical fiber ranging between 80 μJ per pulse and 160 μJ per pulse. In one embodiment, laser 102 emits laser beam 120 at an output power of 8 W with a corresponding actual laser energy used for perforating an optical fiber of 112 μJ per pulse (about 70% of maximum pulse energy).

As mentioned previously, laser beam 120 passes through shutter 104. Shutter 104 is configured to control the exposure of laser beam 120 to the remainder of laser-cleaving apparatus 100. When shutter 104 is opened, laser beam 120 passes through shutter 104 and moves to reflecting mirror 106.

Reflecting mirror 106 is configured to reflect laser beam 120 in a different direction than the direction when emitted by laser 102. As shown, reflecting mirror 106 reflects laser beam 120 such that laser beam 120 moves in a direction that is substantially perpendicular (or orthogonal) relative to the previous direction. Stated another way, as shown in FIG. 1, laser beam 120 is moving in the y-direction and upon contacting reflecting mirror 106, laser beam 120 moves in the z-direction. In alternate embodiments, other various angle reflections may be possible relative to the incoming direction via reflecting mirror 106.

Laser beam 120 then proceeds through a series of lenses or optics 108 that are controlled by a translation stage 122. As shown in FIG. 1, lenses 108 include an axicon lens 108A, a convex lens 108B, and an objective lens 108C. Lenses 108 are configured to create a Bessel beam 109 and focus Bessel beam 109 onto an optical fiber array 124 seated on stage 110 as described below. In alternate embodiments, other series and combinations of lenses and/or different lenses (e.g., a pair of collimating lenses) and/or other optics (e.g., spatial light modulator (SLM)) may be used to create and focus Bessel beam 109 onto optical fiber array 124 and are contemplated in the present disclosure.

Translation stage 122 controls the positioning of the series of lenses 108 between reflecting mirror 106 and stage 110 along the z-axis as shown in FIG. 1. Translation stage 122 is operably connected to computer 116 and driver 118 such that computer 116 provides instructions to driver 118, and driver 118 moves translation stage 122 according to such instructions. In this way, laser beam 120 undergoes beam shaping as discussed below and is focused onto optical fiber array 124. Beam shaping is a process of redistributing the irradiance or phase of an optical radiation using a purpose designed optical element with a suitable lens or several lenses. In one embodiment, laser beam 120 is shaped from a Gaussian beam to a Bessel beam via beam shaping by lenses 108 and translation stage 122. In one embodiment, laser beam 120 has a spot size of about 1 μm with a relative long line of focus of about 1 mm (which can fully cover the entire diameter of optical fiber array 124) after passing through lenses 108. In one embodiment, the velocity of translation stage 122 is about 20 mm/s.

After passing through lenses 108, laser beam 120 (also referred to as "Bessel beam 108") is focused onto optical fiber ribbon 124 that is positioned on stage 110. As mentioned previously, in one embodiment, optical fibers of optical fiber array 124 have core and cladding diameters of about 9.0 and 125 μm, respectively. However, it is contemplated that alternate optical fibers may be used in the context of the present disclosure. The coated ends of the fibers in the optical fiber array is stripped (e.g., thermally or the like) after the optical fiber jacket (not shown) is removed, and optical fiber ribbon is cleaned by methods known in the art. A coated region of the fibers in the array of optical fibers or of the optical fiber array 124 is then clamped onto a fiber holder prior to mounting optical fiber array 124 onto stage 110.

Figure 2:
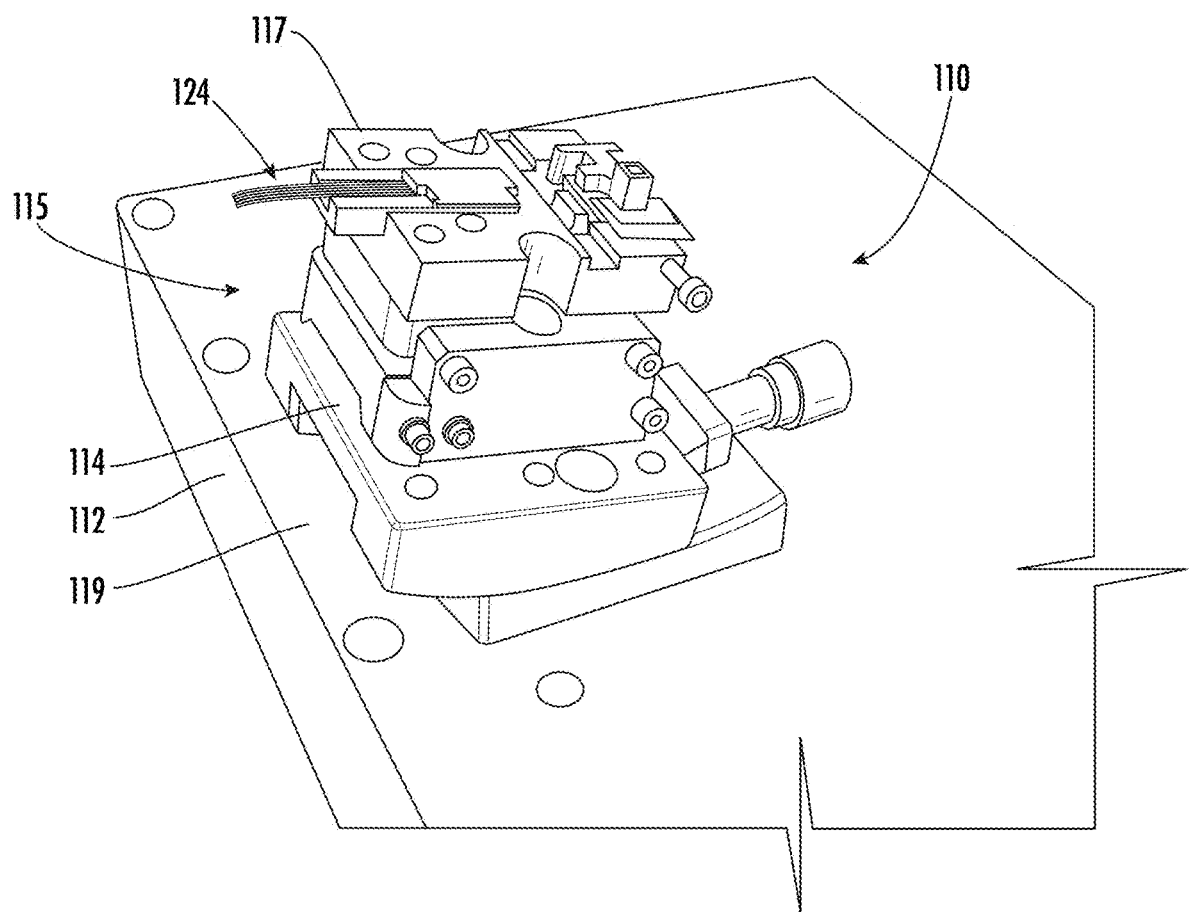
FIG. 2 is a perspective view of a stage of the laser-cleaving apparatus of FIG. 1.
Figure 2A:
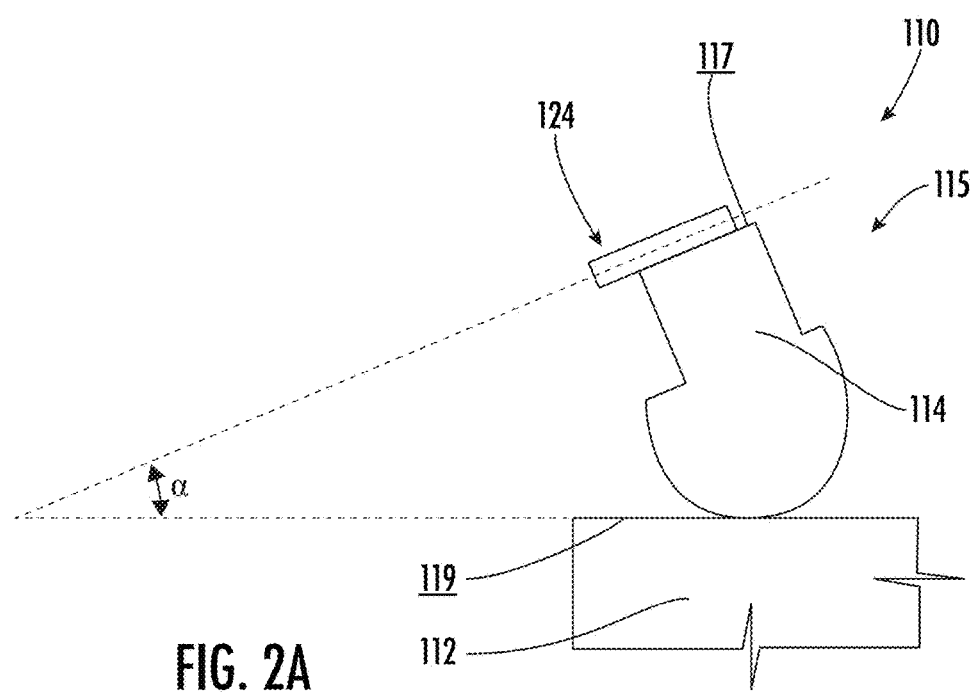
FIG. 2A is a schematic of the stage of FIG. 2 illustrating a method of securing the coated or ribbonized portions an array of optical fibers for achieving an angled cleave according to the present disclosure.

Stage 110 includes an upper stage 114 and a lower stage 112. As shown in FIGS. 1 and 2-2A, upper stage 114 is configured to support optical fiber array 124 upon top surface 117. Stated another way, a coated or ribbonized region of the optical fiber array 124 and the fiber holder are mounted onto upper stage 114. Upper stage 114 comprises a tiltable structure 115 that can angle optical fiber ribbon 124 at an angle α relative to upper surface 119 of lower stage 112. In some embodiments, angle α (FIG. 2A) ranges between −15 degrees and 15 degrees relative to upper surface 119. By angling optical fiber array 124 via tiltable structure 115, an angled cleave of optical fiber ribbon 124 can result. In some embodiments, the angle of the angle cleave ranges between 0 degrees and 15 degrees relative to a longitudinal axis of each optical fiber of optical fiber ribbon 124.

Lower stage 112 supports upper stage 114 along upper surface 119 (of lower stage 112) and is operably connected to driver 118 and computer 116. Computer 116 and driver 118 operate to move lower stage 112 and stage 110 along the x-axis and the y-axis during operation of apparatus 100 in order to cleave the optical fibers in optical fiber array 124. In one embodiment, lower stage 112 has a resolution of about 0.01 μm. In another embodiment, lower stage 112 has a velocity of about 20 mm/s during laser treatment or laser-cleaving (e.g., fabrication) of optical fiber array 124.

To operate apparatus 100, a coated or ribbonized portion of the optical fiber array 124 is placed and secured onto upper stage 114 of stage 110. Then, laser 102 is activated to emit laser beam 120. In one embodiment, laser 102 emits laser beam 120 at a wavelength of 1030 nm, a pulse width of 10 ps, a repetition rate of 50 kHz, and an output power of 8 W. Laser beam 120 is emitted from laser 102 and travels throughout apparatus 100 as shown in FIG. 1 (i.e., passing through shutter 104, reflecting off reflecting mirror 106, and passing through lenses 108) such that laser beam 120 passes across the optical fiber array 124 to create perforation(s) on the optical fibers in optical fiber array 124 as discussed below. Stated another way, apparatus 100 provides a single pass laser 102 and laser beam 120 across the optical fibers in optical fiber array 124 to sequentially create perforation(s) in each optical fiber in optical fiber array 124.

Referring to FIG. 3, an image of an optical fiber 124A in optical fiber array 124 is shown after undergoing laser treatment administered by apparatus 100. As shown, optical fiber 124A includes a plurality of apertures 126A to form a perforation 126. In one embodiment, apertures 126A have a pitch ranging between 1.0 µm and 5.0 µm. In one embodiment, the pitch between apertures 126A is about 2.4 µm. Pitch as discussed herein refers to the distance between a center of one aperture 126A to a center of another adjacent aperture 126A.

Figure 4:
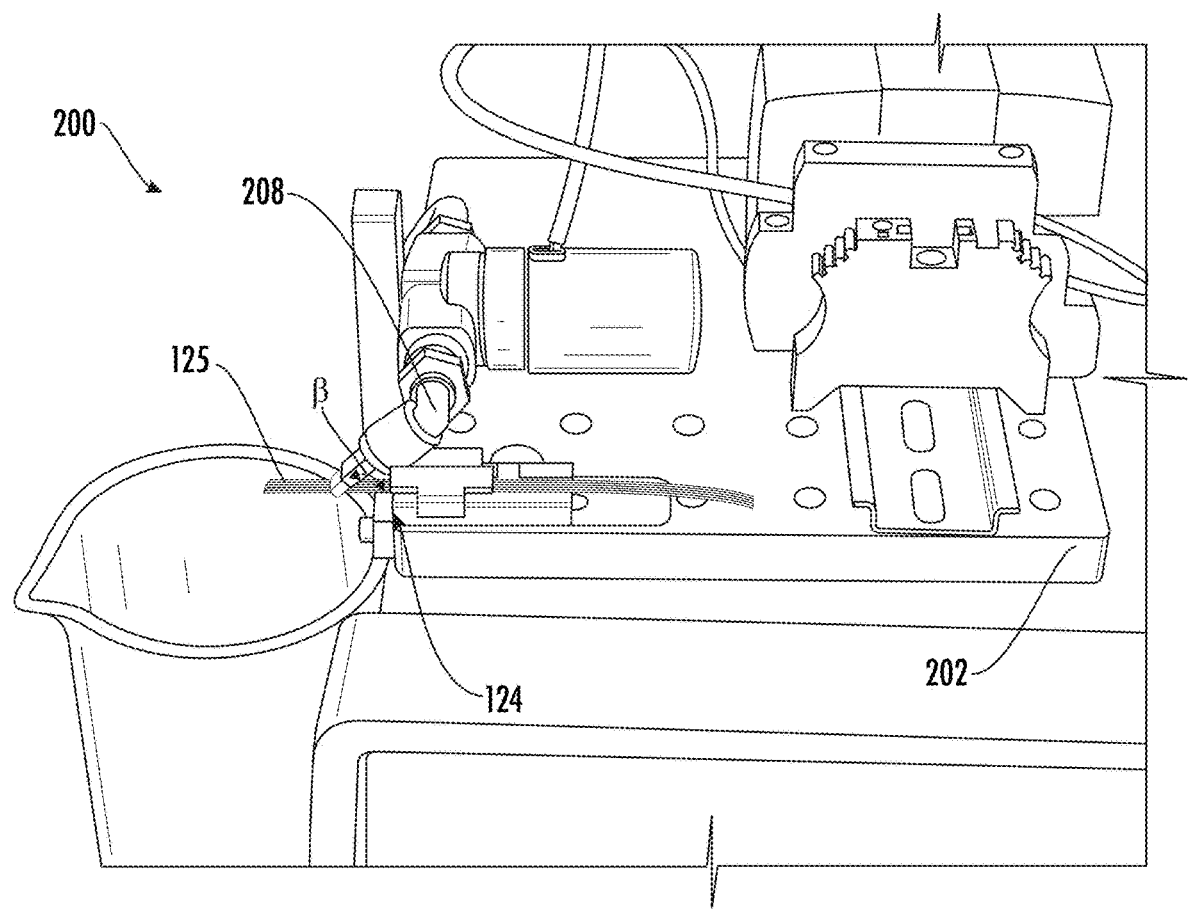
FIG. 4 is a perspective view of a mechanical separation apparatus according to the present disclosure.
Figure 4A:
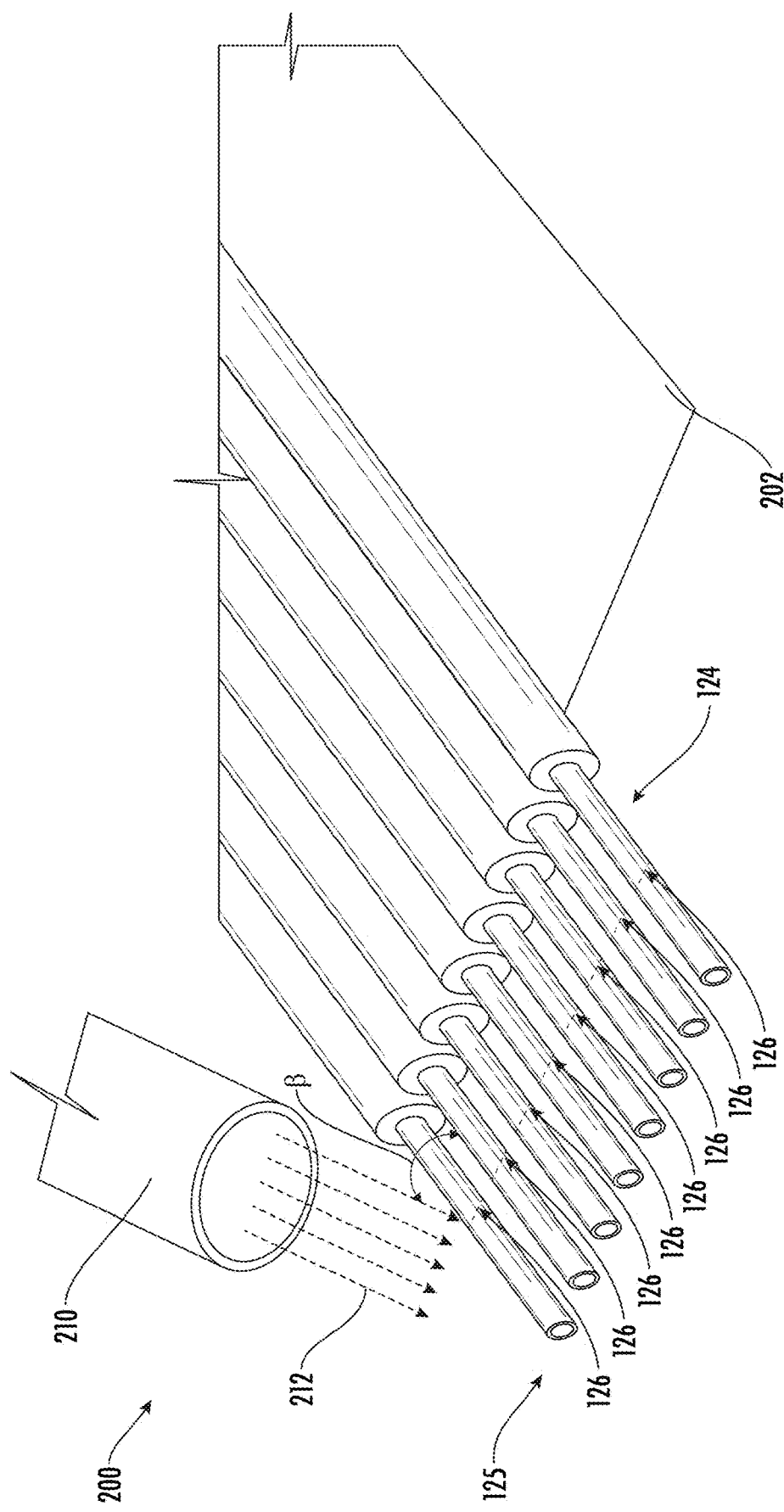
FIG. 4A is an enlarged perspective view of a portion of the mechanical separation apparatus of FIG. 4.

Once perforation 126 is formed on each of the optical fibers in the optical fiber array 124, the optical fibers in optical fiber array 124 are separated along perforation 126 to remove the free ends 125 of the optical fibers in the optical fiber array 124 and to complete the cleaving process of the optical fiber array 124. Referring now to FIG. 4, a separation apparatus 200 is provided to separate the free ends of the optical fibers in the optical fiber array 124 along perforation 126. Apparatus 200 includes a stage 202 upon which optical fiber array 124 and a pressurized air jet 208 are positioned. As shown in FIG. 4A, air jet 208 includes a nozzle 210 and applies pressurized air 212 onto the optical fiber array 124 and perforation 126 such that the free ends 125 of the optical fibers in the optical fiber array 124 are removed along perforation 126. Pressurized air 212 is applied onto optical fiber ribbon 124 with an exposure time ranging between 0.1 seconds and 5 seconds, between 0.1 seconds and 3 seconds, or between 0.1 seconds to 1 second and an amount of pressurized air ranging between 1 pounds per square inch (psi) to 50 psi, between 5 psi and 50 psi, or between 10 psi and 50 psi.

Figure 4B:
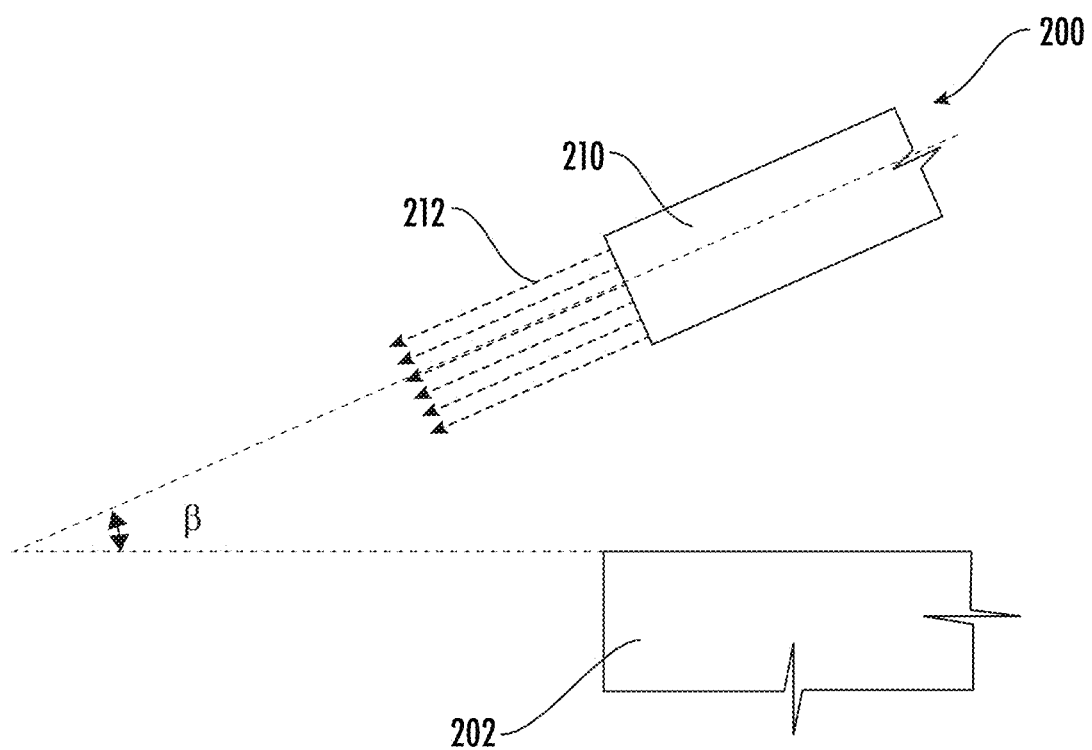
FIG. 4B is a side view schematic of the mechanical separation apparatus of FIG. 4A omitting the optical fibers.

In one embodiment, the exposure time and amount of applied pressurized air 212 is 0.3 seconds and 40 psi, respectively. FIGS. 4A and 4B show pressurized air 212 being administered at an angle β relative to stage 202. In some embodiments, the angle β ranges between 30° and 60°. It is within the scope of the present disclosure that pressurized air 212 can be administered substantially parallel to stage 202. Additionally, the distance between the nozzle of air jet 208 and optical fiber array 124 can be varied.

Figure 5:
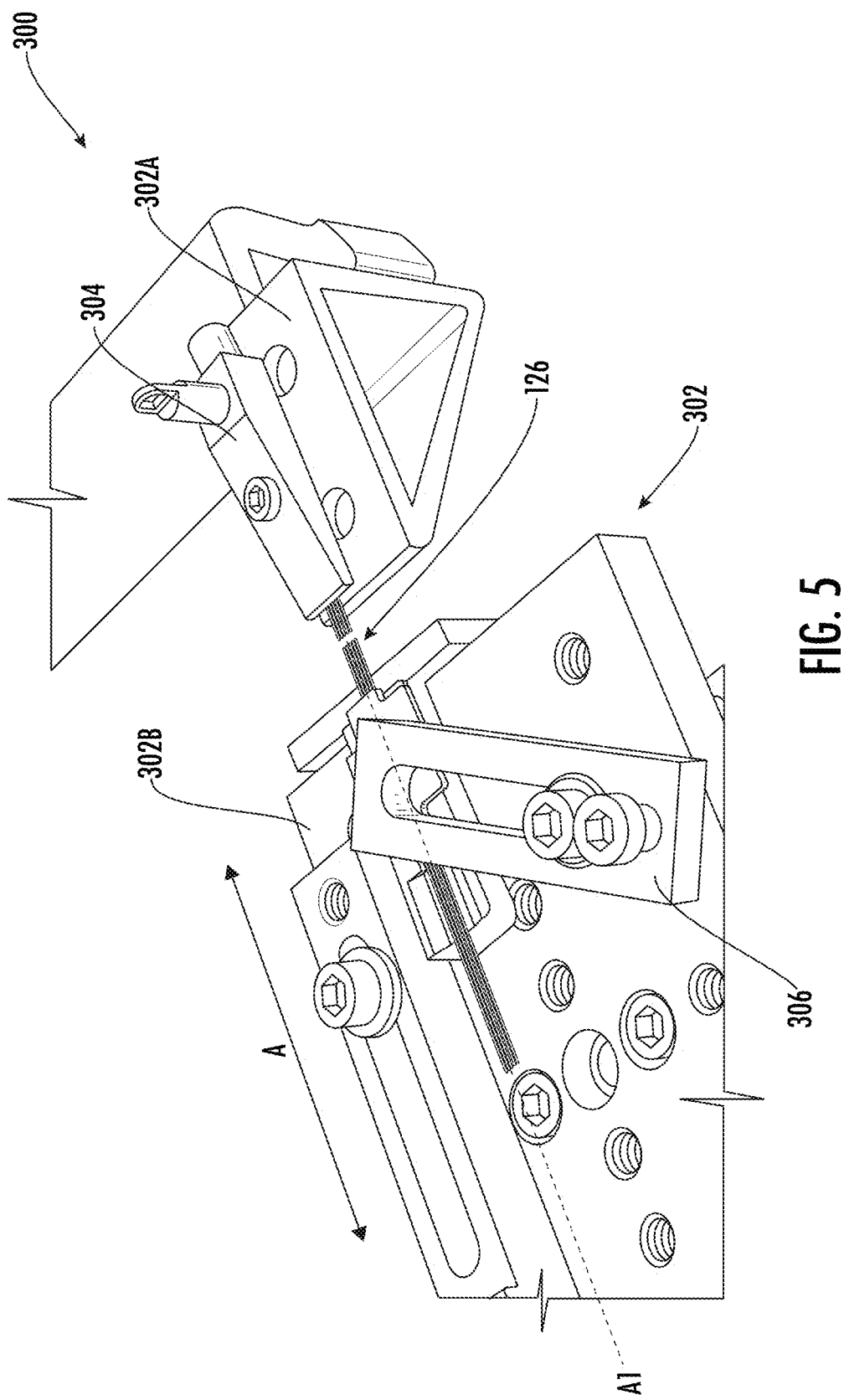
FIG. 5 is a perspective view of another mechanical separation apparatus according to the present disclosure.

Referring now to FIG. 5, an alternative separation apparatus 300 (hereinafter referred to as "tension apparatus 300") is shown. Tension apparatus 300 includes a stage 302 that has a first section 302A and a second section 302B where at least one of first section 302A and second section 302B is motorized. First section 302A includes a clamp 304 that clamps onto a coated region of optical fiber array 124 on one side of perforation 126 and holds optical fiber array 124 in place on stage 302. Second section 302B includes a clamp 306 that holds optical fiber array 124 opposite clamp 304 and on the other side of perforation 126 as shown.

To operate tension apparatus 300, optical fiber array 124 is placed onto stage 302 with perforation 126 positioned between first section 302A and second section 302B of stage 302. Optical fiber array 124 is clamped onto stage 302 by clamps 304, 306 as discussed above. Second section 302B remains static while first section 302A moves along a direction A in line with longitudinal axis A1 of optical fiber array 124 to apply tensile stress onto optical fiber array 124 along perforation 126. In an alternate embodiment, second section 302B moves along longitudinal axis A1 of optical fiber array 124 while first section 302A remains static to apply tensile stress onto optical fiber array 124 along perforation 126. In another alternate embodiment, first section 302A and second section 302B both move to apply tensile stress onto optical fiber array 124 along perforation 126. It is within the scope of the present disclosure that the translation velocity and ramp rate of first section 302A and second section 302B can be precisely controlled.

Figures 6A, 6B:
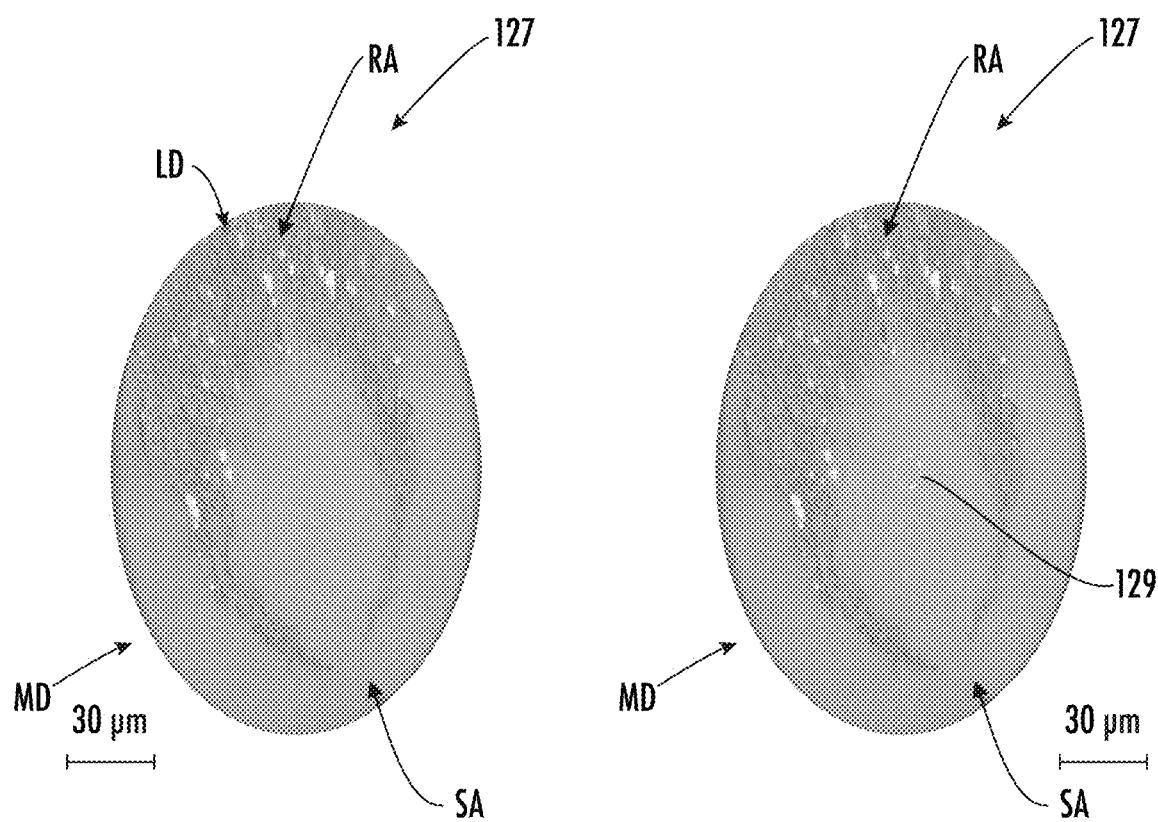
FIGS. 6A-6C relate to Example 1 and are microscope images of an end-face of an optical fiber after undergoing laser treatment by the laser apparatus of FIG. 1.
Figure 6C:
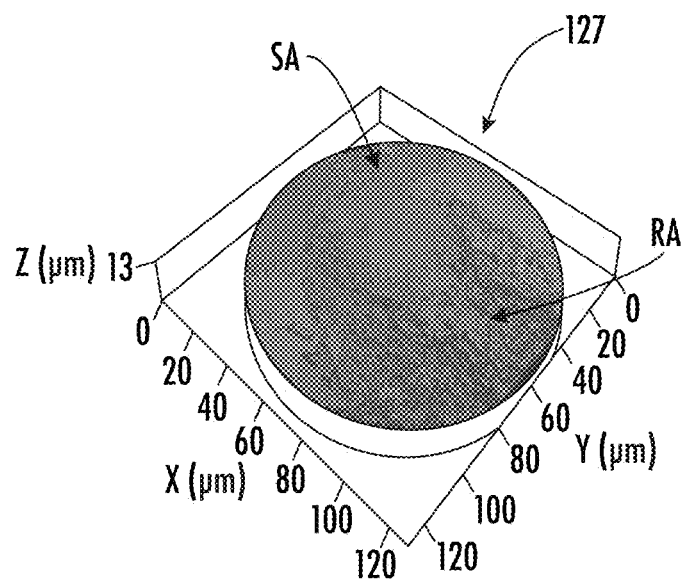

Referring now to FIGS. 6A-6C, images of an end-face 127 (also referred to as "optical fiber end-face 127" or "fiber end-face 127") of an optical fiber of optical fiber array 124 (after laser-cleaving and mechanical separation) are shown. As shown in FIG. 6A, optical fiber array 124 has been laser-cleaved by apparatus 100 in laser direction LD as indicated. In addition, optical fiber array 124 has been mechanically separated by apparatus 200 along the perforation (not shown) in moving direction MD as shown. Upon cleaving and separation, optical fiber end-face 127 as shown in FIGS. 6A and 6B has a surface profile that varies about optical fiber end-face 127. In particular, optical fiber end-face 127 has a substantially symmetrical surface profile pattern where the surface variation about optical fiber end-face 127 varies by less than 1 micron (µm). Such a low surface variation about optical fiber end-face 127 can be resolved (i.e., reflowed or compensated) when splicing with another optical fiber.

Optical fiber end-face 127 has a surface area SA that includes a rough area RA comprising a portion of the surface area of optical fiber end-face 127, and the rough area RA has a corresponding surface roughness. In some embodiments, optical fiber end-face 127 has a rough area RA comprising at least 5% of the surface area. In another embodiment, optical fiber end-face 127 has a rough area RA comprising over 80% of the surface area of optical fiber end-face 127. In another embodiment, the rough area RA of optical fiber end-face 127 has a surface roughness of between 0.1 µm and 0.5 µm root mean squared (rms) as measured by a laser confocal microscope (e.g., LSM 700, Zeiss). In other embodiments, the remainder of the surface area of optical fiber end-face 127 (excluding the rough area) has a surface roughness of less than 10 nm rms. In particular, in terms of surface roughness, fiber core 129 (also referred to as "core 129") has a surface roughness of between 0.1 µm rms and 0.5 µm rms in some embodiments. In another embodiment, fiber core 129 has a surface roughness of less than 10 nm rms. Referring briefly to FIG. 6C, a surface roughness plot is shown corresponding to optical fiber end-face 127 shown in FIGS. 6A-B. In FIG. 6C, the surface roughness is about 0.5 µm, which is suitable for future splicing with other optical fibers.

Referring in particular to FIG. 6B, the rough area of optical fiber end-face 127 does not include fiber core 129. Stated another way, as previously discussed, fiber core 129 is substantially unaffected by the roughness of optical fiber end-face 127 that is imparted upon laser-cleaving and mechanical separation. In this way, the optical fiber performance (i.e., insertion loss) is substantially unaffected by the laser-cleaving and mechanical separation processes described above. Without wishing to be held to a particular theory, it is believed that the geometry of optical fibers of optical fiber array 124 (e.g., curved shape) can act as a lens to shape incident laser beam 120. That is, the geometry of optical fibers of optical fiber array 124 either distort and/or refract laser pulses of laser beam 120 when laser beam 120 and the surfaces of the optical fibers in optical fiber array 124 are at an oblique angle with respect to one another or move laser pulses of laser beam 120 forward when laser beam 120 and the surface of the optical fibers in optical fiber array are perpendicular to each other. Without wishing to be held to a particular theory, it is believed that the laser pulse of laser beam 120 does not affect the fiber core region due to the lensing effect (distortion and/or refraction) of the surfaces of the optical fibers in optical fiber array 124 and limited pulse energy.

Also, the laser-cleaving and mechanical separation processes described above substantially maintain the concentricity of fiber core 129 along optical fiber 124A. That is, the laser perforation 126 formed by apparatus 100 and the subsequent separation process by either apparatus 200, 300 do not substantially deform optical fiber 124A and fiber core 129. In some embodiments, fiber core 129 at fiber end-face 127 (hereinafter referred to as "end-face core") is substantially concentric with a fiber core of optical fiber 124A measured at a distance (e.g., about 1 mm) from fiber end-face 127, wherein the end-face core and the fiber core have an offset of less than 0.1 µm.

In alternate embodiments, alternative methods for cleaving an optical fiber array with subsequent separation are contemplated in this disclosure such as water-based cleaving as discussed below in the Examples.

Example 1 Relating to Optical Fiber Array 124 Having a 0° Cleave Angle (Flat Optical Fiber End-Face 127

FIGS. 3 and 6A-9B illustrate representative simulations and images for optical fiber arrays comprising single mode optical fibers that have been cleaved with a flat optical fiber end-face (i.e., 0° cleave angle). In particular, the optical fiber array underwent laser-cleaving with mechanical separation by a pressurized air jet as disclosed herein. While this Example relates to an optical fiber array containing single mode optical fibers, it is within the scope of the present disclosure that alternate types of optical fiber arrays may be used (e.g., optical fiber arrays containing multimode optical fibers) to yield the properties discussed herein.

Figure 7C:
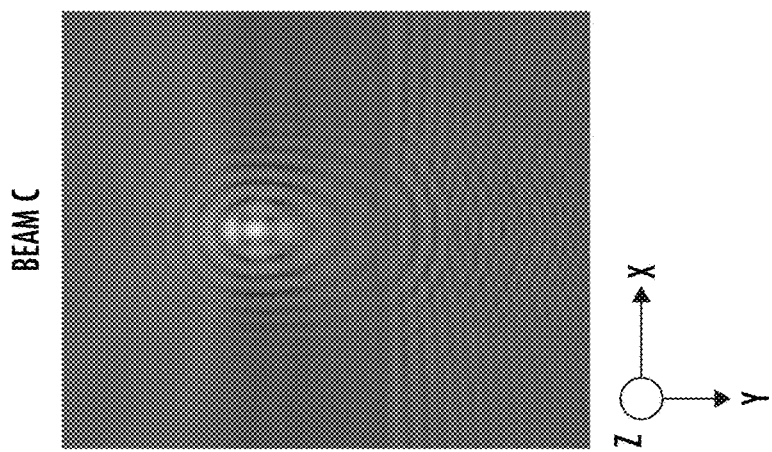
FIGS. 7A-7C relate to Example 1 and show results of a plane-wave decomposition model simulation of Bessel beams impinging on an optical fiber at a perpendicular angle relative to a longitudinal axis of the optical fiber with a varying offset in the y-direction as shown and defined in FIGS. 7A-7C.
Figure 7B:
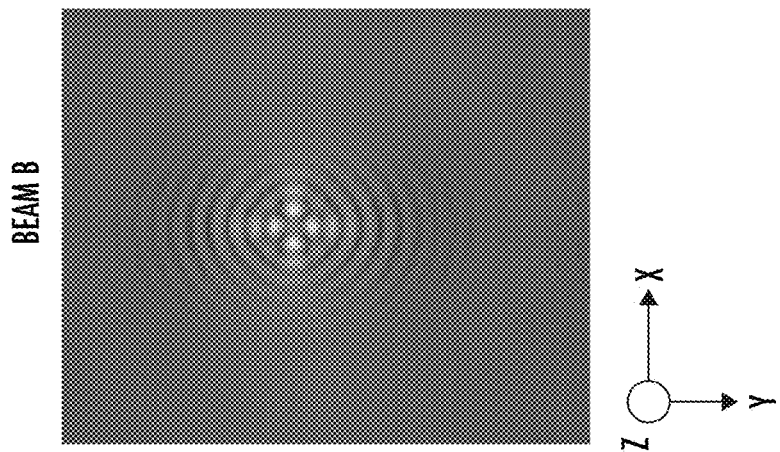
Figure 7A:
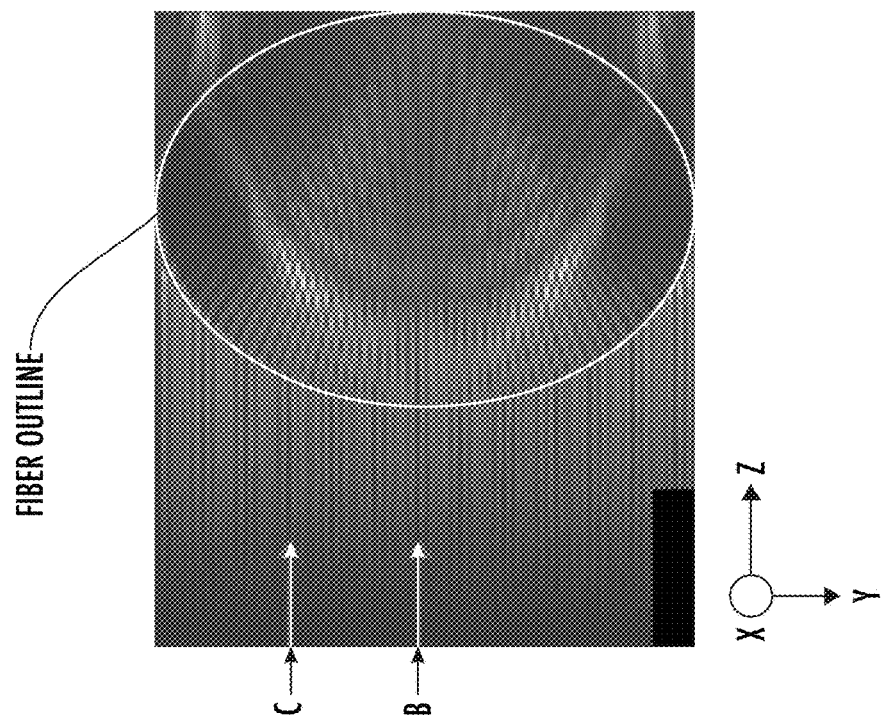

Referring now to FIGS. 7A-7C, results of a plane-wave decomposition model simulation of Bessel beams entering an optical fiber of an optical fiber array at a perpendicular angle relative to a longitudinal axis of the optical fiber with a varying offset in the y-direction (as shown and defined in FIGS. 7A-7C) are shown. In FIG. 7A, the intensity profiles of the beams were combined additively, and a similar optical fiber end-face pattern is shown on FIG. 7A as that of rough area RA of optical fiber end-face 127 of FIGS. 6A and 6B as discussed below.

Additionally, Bessel beams aligned near the center of the optical fiber (at the optical fiber surface) travelled a shorter distance into the optical fiber before the paths of the beams are distorted due to the lens effect of the optical fiber discussed previously. Bessel beams aligned near the edge of the optical fiber experienced refraction so that their angle bent towards the center of the optical fiber. As shown, these laser beam movement patterns upon contacting the optical fiber and moving within the optical fiber yield the rough area RA pattern on optical fiber end-face 127 as shown in FIGS. 6A and 6B.

Referring now to FIGS. 7B and 7C, the focal points of the Bessel beam after propagating halfway through the optical fiber are shown. In FIG. 7B, Bessel beam B was launched in the middle of the optical fiber, while in FIG. 7C, Bessel beam C was launched near the edge of the optical fiber (an offset in the y-direction equal to one quarter of the diameter of the optical fiber). In both cases, the Bessel beams are turned on at a distance of about 1 centimeter (cm) away from the optical fiber(s). In this way, the stage upon which the optical fiber(s) is/are resting can reach a steady velocity before laser treatment of the optical fiber(s). It is contemplated and within the scope of the present disclosure that the laser can move at a steady velocity while the stage and optical fiber(s) are stationary with the stage and the laser being separated by a distance as discussed above. As can be seen, there are distortions in the focal points of the beam which protects the fiber core from laser damage. Stated another way, the Bessel beam creates a line of focus on the optical fiber(s). Bessel beams that contact the optical fiber(s) near/in line with the center of the optical fiber(s) travel a shorter distance into the optical fiber(s) before distorting as compared to Bessel beams near the edge of the optical fiber(s) which are refracted such that the Bessel beams' angle bends towards the center of the optical fiber.

Figure 8A:
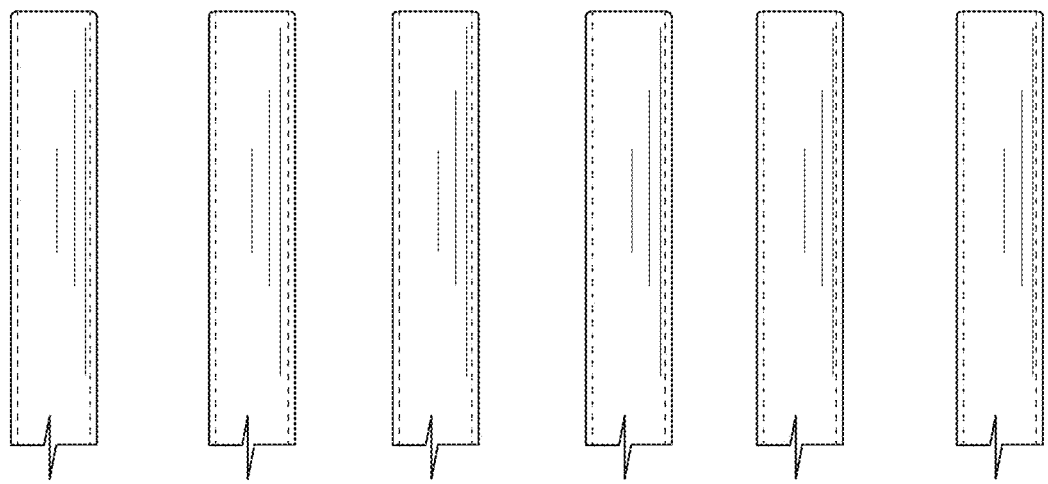
FIGS. 8A and 8B relate to Example 1 and show top and side views, respectively, of microscopic images of the laser-cleaved ends of an array of optical fibers.
Figure 8B:
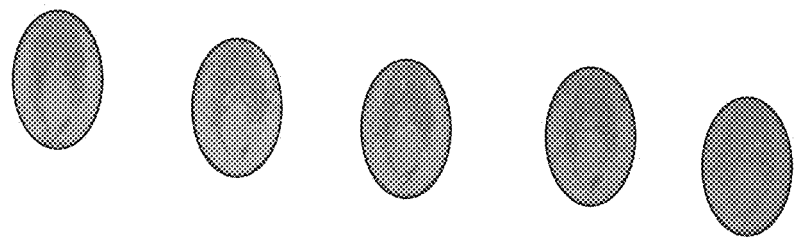

Referring now to FIGS. 8A and 8B, top and side views, respectively, of microscopic images of optical fibers of a laser-cleaved optical fiber array is shown. Upon examination and measurement of the cleave lengths (based on methods known in the art—e.g., with confocal microscopes), a low variability in cleave length was observed (less than 5 µm) indicating repeatability of the cleaving and separation methods disclosed herein. Moreover, symmetrical patterns can be found on the optical fiber end-faces, and the optical fiber end-faces are substantially identical with one another in the optical fiber array.

Figure 9B:
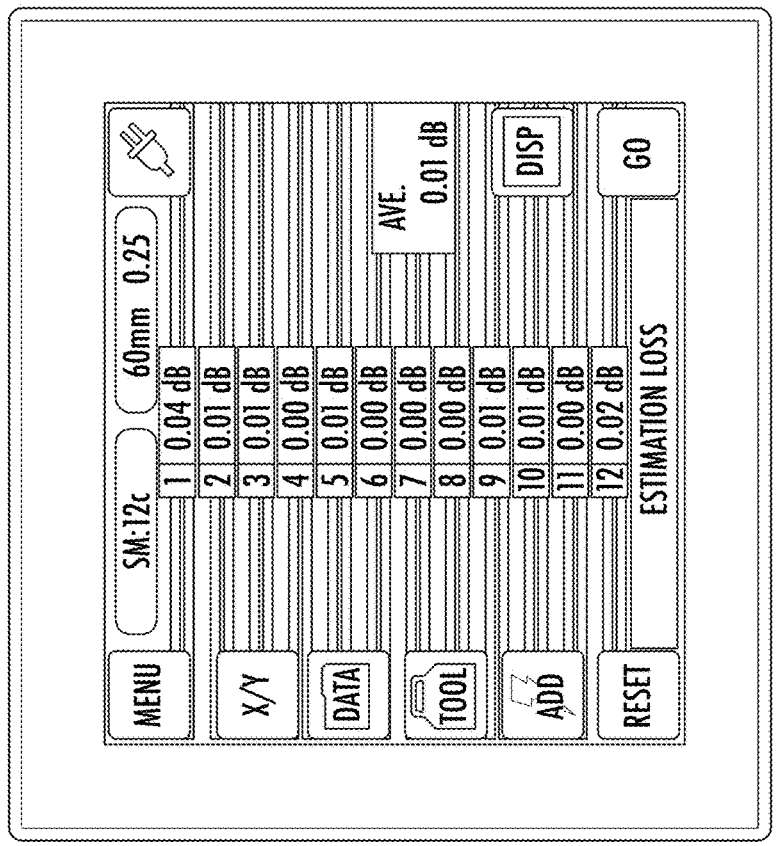
FIGS. 9A and 9B relate to Example 1 and show images of cleaving quality of an array of optical fibers prior to fusion splicing and after fusion splicing, respectively.
Figure 9A:
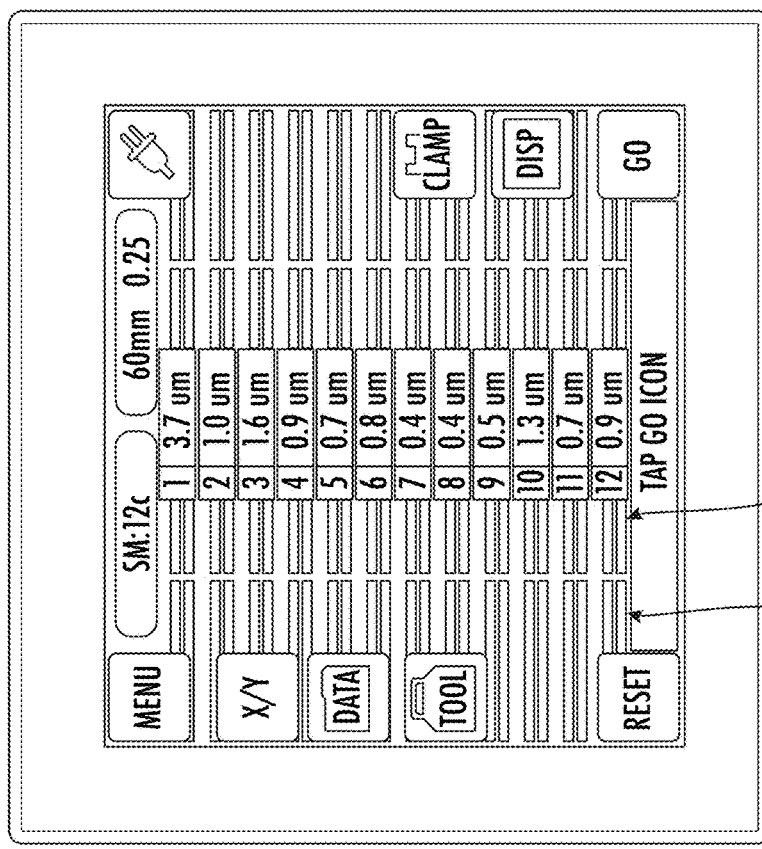

Finally, the laser-cleaved optical fiber array samples were inspected using a commercial fusion splicer. FIG. 9A shows the images of cleaving quality prior to fusion splicing the optical fiber array sample, and FIG. 9B shows the images of cleaving quality after fusion splicing the optical fiber array sample. Referring first to FIG. 9A, the optical fiber array sample on the right was laser-cleaved while the optical fiber array sample on the left was mechanically cleaved using a commercial mechanical cleaver. The flatness of the laser-cleaved sample is almost identical to the mechanically cleaved sample as shown by no significant angle variation in the X or Y directions for the laser-cleaved sample. Referring now to FIG. 9B, the spliced optical fiber array samples show an average estimated insertion loss of about 0.01 dB based on optical fiber positioning with each other (i.e., relative offset between the optical fibers) and/or cleave angle of the optical fibers indicating that the cleave and separation method as discussed herein maintain the quality of the optical fiber end-face such that fusion splicing of such cleaved optical fibers is possible with limited insertion loss.

Example 2 Relating to Optical Fiber Array 124 Having a 8° Cleave Angle (Angled Optical Fiber End-Face 127)

FIGS. 10A-12 illustrate microscopic images for optical fiber arrays comprising single mode optical fibers that have been cleaved at an angle of about 8° by tilting the upper stage of the stage of the laser apparatus as discussed above. In particular, the optical fiber array underwent laser-cleaving with mechanical separation by a pressurized air jet as disclosed herein. While this Example relates to an optical fiber array containing single mode optical fibers, it is within the scope of the present disclosure that alternate types of optical fiber arrays may be used (e.g., optical fiber arrays containing multimode optical fibers) to yield the properties discussed herein.

Figure 10A:
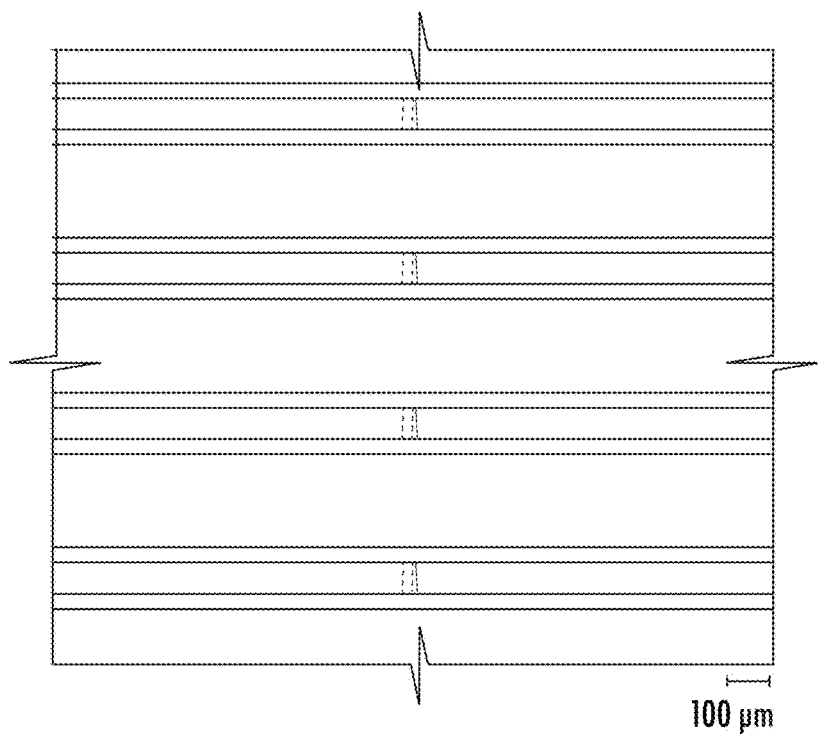
FIGS. 10A and 10B relate to Example 2 and are microscope images of the laser-cleaved end of an array of ribbonized optical fibers.
Figure 10B:
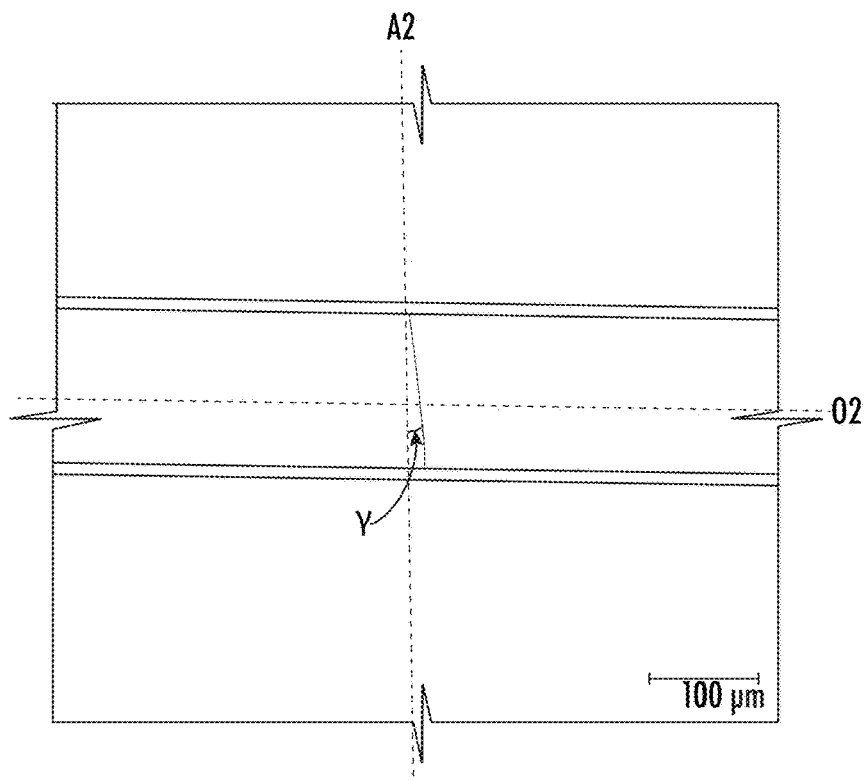
Figure 11:
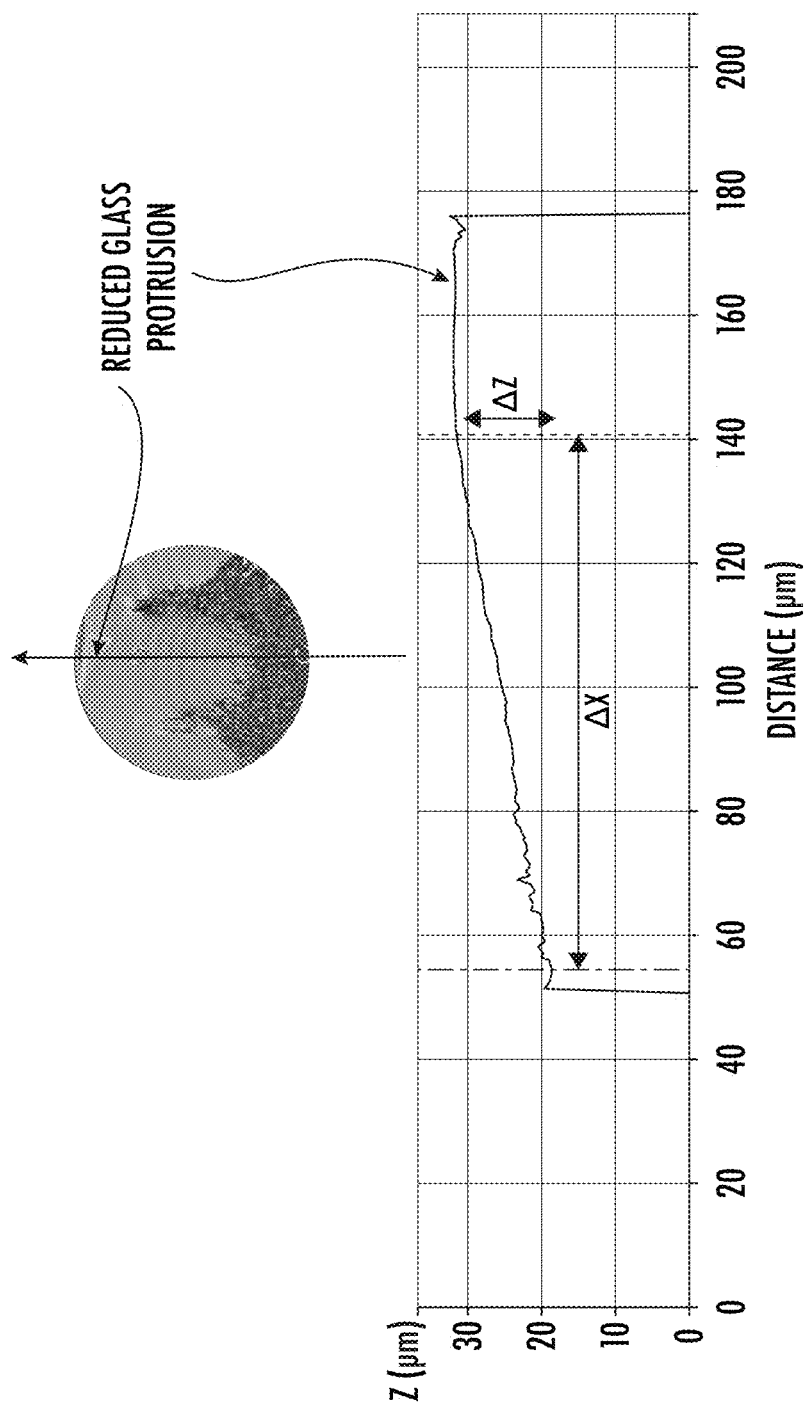
FIG. 11 relates to Example 2 and shows an end-face of an optical fiber after mechanical separation by a pressurized air jet in accordance with the present disclosure.

Referring first to FIGS. 10A and 10B, a sample optical fiber array (from a ribbon cable containing 12 optical fibers) was examined under a microscope after laser-cleaving as described above and prior to mechanical separation. As shown in FIG. 10A, the length of the perforations among each of the optical fibers of the optical fiber array sample was substantially consistent with limited variability in perforation length. FIG. 10B shows the side view of one of the optical fibers of the optical fiber array sample of FIG. 10A and illustrates the estimated cleave angle γ of about 8° (8.6°) relative to axis A2 that is perpendicular to the optical fiber axis OA as shown in FIG. 10B.

As mentioned previously, the optical fiber array sample was then mechanically separated by a pressurized air jet as discussed above. The optical fiber array sample was then checked under a microscope with the corresponding image shown in FIG. 11. The angle of the fiber core of the cleaved array can be estimated using $\tan^{-1}(\Delta z/\Delta x)$ as indicated, which is about 8.6°. The end angles of the other optical fibers of the optical fiber array sample were measured and were similar to the mean and angle variation of 8.3°±0.5°. Also, as shown, there is a reduced glass protrusion extending beyond the fiber core on the optical fiber end-face. Without wishing to be held to any particular theory, it is believed that when the optical fiber(s) are air separated after laser-cleaving, the opposite edge relative to the direction of cleaving (also known as "roll-off") of the optical fiber(s) has a slight inward curve relative to the optical fiber end-face, which is beneficial in that such a curve assists greater contact between the core region of the optical fiber(s) and another optical fiber end-face. Stated another way, because the cleaved end is inwardly curved, the maximum glass protrusion beyond the fiber core is small/minimal, which improves coupling the optical fiber end-face to another optical fiber end-face or a waveguide.

Referring now to FIG. 12, the optical fiber shown was laser-cleaved and then mechanically separated by tension as discussed above. As shown in the microscopic image, the cleaved optical fiber end-face is almost flat after tension separation, which indicates that the glass protrusion beyond the fiber core is large. Such a configuration may be useful for other potential application, such as coupling with special lenses, laser diode manufacturing, etc.

Figure 13A:
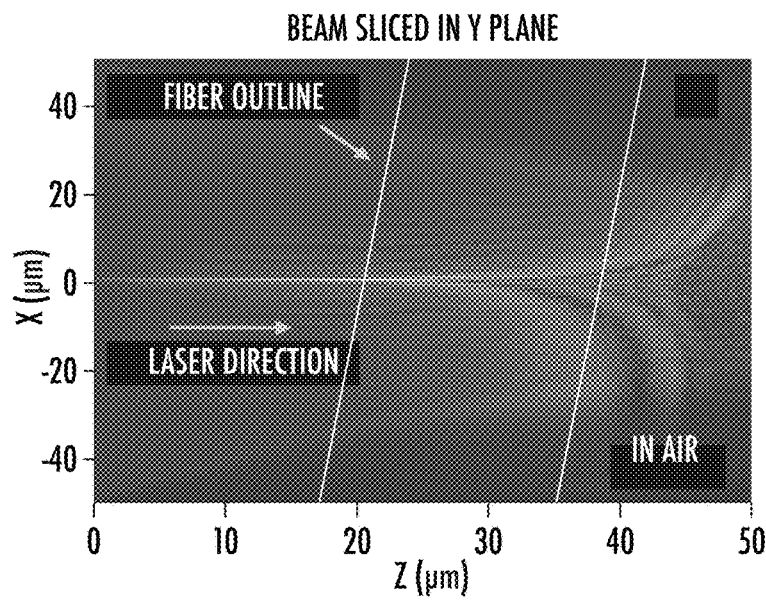
FIG. 13A relates to Example 3 and shows a simulation of the intensity profile (seen in XZ plane) of a Bessel beam directed to the center of a tilted optical fiber end-face when assuming the optical fiber is placed in air.

Example 3 Relating to Water Assisted Laser Angle Cleaving of Optical Fiber Array Water assisted laser-cleaving is also suitable for making an angled cleave of an optical fiber array. Without wishing to be held to any particular theory, it is believed that by immersing the optical fiber array in liquid during laser perforation processing both sources of aberration due to index matching between the fiber and water are reduced. FIG. 13A shows a simulation of the intensity profile (seen in XZ plane) of a Bessel beam directed to the center of a tilted optical fiber end-face when assuming the optical fiber is placed in air. FIG. 13C shows the intensity profile (seen in XZ plane) of a Bessel beam launched to the center of the tilted optical fiber end-face while the optical fiber is immersed in water. When comparing FIGS. 13A and 13C, there are reduced aberrations/distortions of the laser path/direction as the laser beam passes through the optical fiber in water as compared to air.

Additionally, aberrations/distortions caused by the curved edge of the optical fiber (shown previously in FIG. 7A) are reduced when the fiber is submerged. Referring briefly to FIG. 13F, twenty (20) Bessel beams were launched into the fiber at different Y-offsets with respect to the fiber core. As shown, higher energies were experienced in the fiber core of the optical fiber due to reduced aberrations. This allows the laser beam to penetrate deeper into the optical fiber, resulting in a greater portion of the optical fiber being damaged by the laser beam.

Figure 13B:
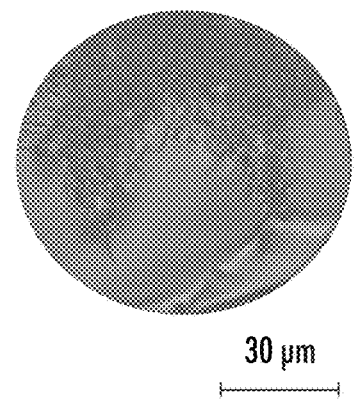
FIG. 13B relates to Example 3 and shows a microscopic image of the optical fiber end-face of FIG. 13A.
Figure 13C:
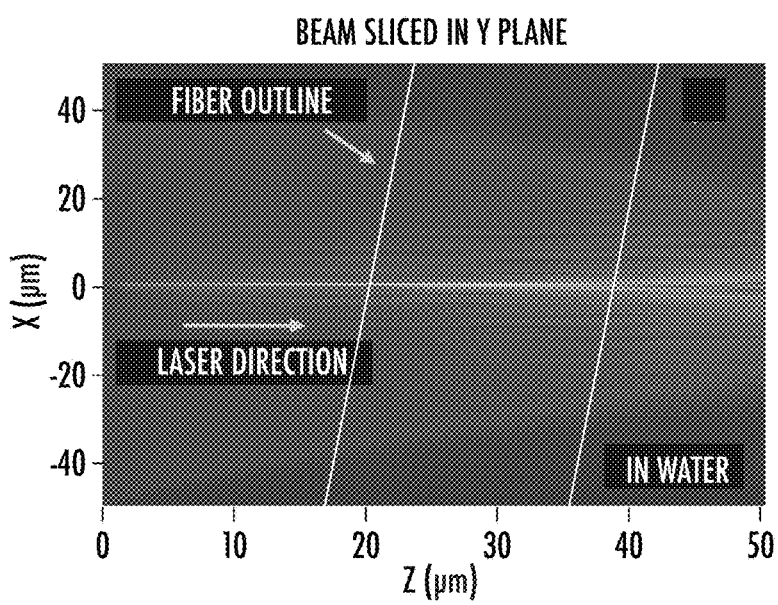
FIG. 13C relates to Example 3 and shows a simulation of the intensity profile (seen in XZ plane) of a Bessel beam launched to the center of the tilted optical fiber end-face while the optical fiber is immersed in water.
Figure 13D:
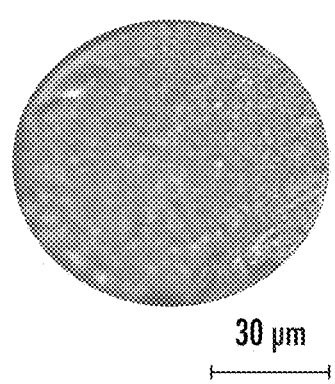
FIG. 13D relates to Example 3 and shows a microscopic image of the optical fiber end-face of FIG. 13C.

Referring now to FIGS. 13B and 13D, an optical fiber end-face of the optical fiber cleaved in the air and an optical fiber end-face of the optical fiber cleaved in water are shown respectively. The optical fibers were separated using controlled, pressurized air jet separation as discussed herein. These images show that a larger portion of the optical fiber end-face was laser damaged when it was submerged during cleaving and separation. As shown in the optical fiber that was immersed in water, the rough surface of the optical fiber end-face extended to more than 80% of the optical fiber end-face surface area, covering substantially the entire optical fiber core. The roughened fiber core may further reduce the back reflections when using an 8° final cleave angled tip for coupling applications (i.e., lensed connectors). If a rough core is not desired, the laser may be switched off as it passes over the center of the fiber to prevent core damage.

Referring now to FIG. 13E, a side view image of a water assisted laser-cleaved optical fiber of an optical fiber array. As shown, a reduction in glass protrusion or "roll-off" (circled in FIG. 13E) relative to the optical fiber end-face was not observed after water assisted laser perforation followed by controlled, pressurized air jet separation.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A laser-cleaved optical fiber array comprising:
   a plurality of optical fibers, each optical fiber having a fiber end-face including an end-face core, each fiber end-face of the optical fibers having a surface area, the surface area comprising a rough area that defines at least a portion of the surface area, wherein the rough area does not include the end-face core;
   wherein the rough area has a surface roughness between 0.1 μm and 0.5 μm root mean squared (rms) as measured by a confocal microscope.

2. The laser-cleaved optical fiber array of claim 1, wherein for each fiber end-face, a remainder of the surface area that excludes the rough area of the fiber end-face has a surface roughness of less than 10 nm rms.

3. The laser-cleaved optical fiber array of claim 1, wherein the rough area of each fiber end-face comprises at least 5% of the surface area.

4. The laser-cleaved optical fiber array of claim 1, wherein the rough area of each fiber end-face comprises over 80% of the surface area.

5. The laser-cleaved optical fiber array of claim 1, wherein each fiber end-face has a surface roughness of less than 10 nm rms in the end-face core.

6. The laser-cleaved optical fiber array of claim 1, wherein each fiber end-face has a surface roughness of between 0.1 μm and 0.5 μm rms in the end-face core.

7. The laser-cleaved optical fiber array of claim 1, wherein for each optical fiber, the fiber end-face has a diameter that is substantially consistent with a diameter of the optical fiber measured at a distance of about 1 mm from the fiber end-face, and wherein the fiber end-face diameter and the optical fiber diameter have a difference of less than 0.2 μm.

8. The laser-cleaved optical fiber array of claim 1, wherein the end-face core is substantially concentric with a fiber core of the optical fiber measured at a distance of about 1 mm from the fiber end-face, and wherein the end-face core and the fiber core have an offset at the fiber end-face less than 0.1 µm.

9. The laser-cleaved optical fiber array of claim 1, wherein each fiber end-face is substantially flat with a cleave angle between 0 degrees and 15 degrees relative to a longitudinal axis of each optical fiber.

10. The laser-cleaved optical fiber array of claim 9, wherein the cleave angle has a cleave angle variation of ±0.5 degrees.

\* \* \* \* \*